US008869818B2

(12) United States Patent
Ko et al.

(10) Patent No.: US 8,869,818 B2
(45) Date of Patent: Oct. 28, 2014

(54) NOISEPROOF VENT VALVE FOR FUEL TANK

(71) Applicant: Dong Hee Industrial Co., Ltd., Ulsan (KR)

(72) Inventors: Hyeong-Do Ko, Suwon-si (KR); Kyun-Bum Park, Gwangmyeong-si (KR); Tae-Hong Kye, Suwon-si (KR); Jong-Mo Yang, Seoul (KR)

(73) Assignee: Dong Hee Industrial Co., Ltd., Ulsan (KR)

( * ) Notice: Subject to any disclaimer, the term of this patent is extended or adjusted under 35 U.S.C. 154(b) by 240 days.

(21) Appl. No.: 13/681,504

(22) Filed: Nov. 20, 2012

(65) Prior Publication Data

US 2013/0133758 A1    May 30, 2013

(30) Foreign Application Priority Data

Nov. 28, 2011    (KR) .................. 10-2011-0124761

(51) Int. Cl.
*F16K 24/04*    (2006.01)

(52) U.S. Cl.
CPC ..................... *F16K 24/04* (2013.01)
USPC .............. 137/202; 251/64; 137/433; 137/430

(58) Field of Classification Search
USPC ............. 137/202, 430, 433, 409, 410; 251/64
See application file for complete search history.

(56) References Cited

U.S. PATENT DOCUMENTS

| 1,299,952 | A  | * | 4/1919  | Jennings ..................... 137/430 |
| 2,195,266 | A  | * | 3/1940  | Bailey ...................... 220/203.2 |
| 5,313,979 | A  | * | 5/1994  | Wang ......................... 137/390 |
| 5,901,733 | A  | * | 5/1999  | Ohno et al. .................. 137/202 |
| 6,405,766 | B1 | * | 6/2002  | Benjey ....................... 141/198 |
| 6,578,597 | B2 | * | 6/2003  | Groom et al. .................. 137/43 |
| 6,612,324 | B2 | * | 9/2003  | Szlaga ........................ 137/2 |
| 6,688,330 | B1 | * | 2/2004  | Ehrman et al. ................ 137/430 |
| 8,100,153 | B2 | * | 1/2012  | Hirata ........................ 141/198 |
| 8,616,232 | B2 | * | 12/2013 | Suzuki et al. ................. 137/202 |
| 2004/0007262 | A1 | * | 1/2004  | Hattori ........................ 137/202 |
| 2007/0131286 | A1 | * | 6/2007  | Benda et al. .................. 137/554 |

FOREIGN PATENT DOCUMENTS

KR    10-2012-0129068 A    11/2012

* cited by examiner

*Primary Examiner* — John Rivell
*Assistant Examiner* — Umashankar Venkatesan
(74) *Attorney, Agent, or Firm* — LRK Patent Law Firm

(57) ABSTRACT

A noiseproof vent valve for a fuel tank is provided. A damping member installed in the vent valve has at least two elastic pieces, preferably the four elastic pieces. The movement of the float is absorbed by elastic deformation of the elastic pieces, and thus the float is prevented from coming into contact with a lower end forming the bottom of a valve body. However excessively the float fluctuates, no "clicking" contact noise occurs at the vent valve. As a result, the merchantability of a hybrid vehicle sensitive to low noise can be greatly increased.

6 Claims, 7 Drawing Sheets

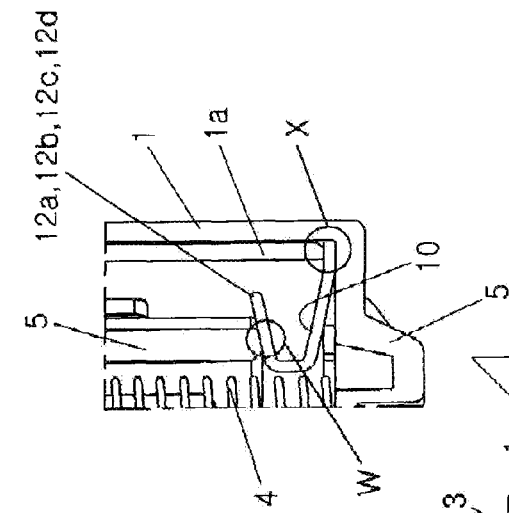
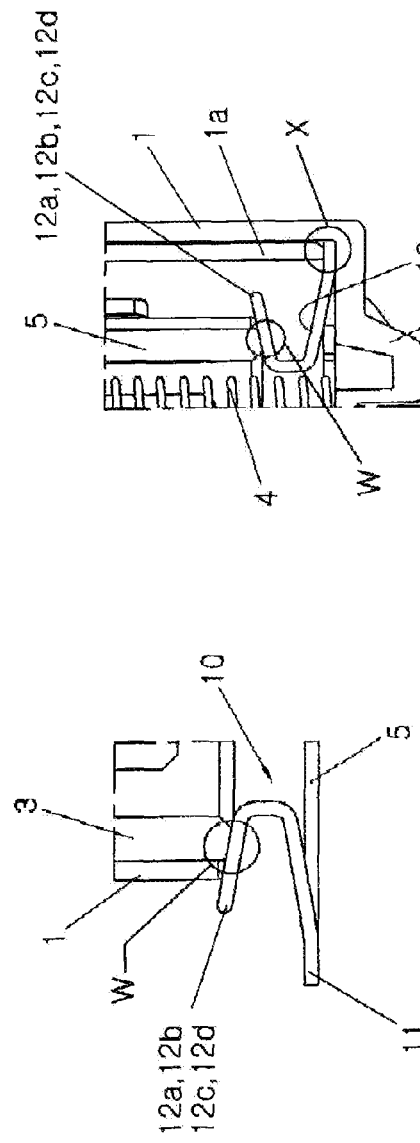
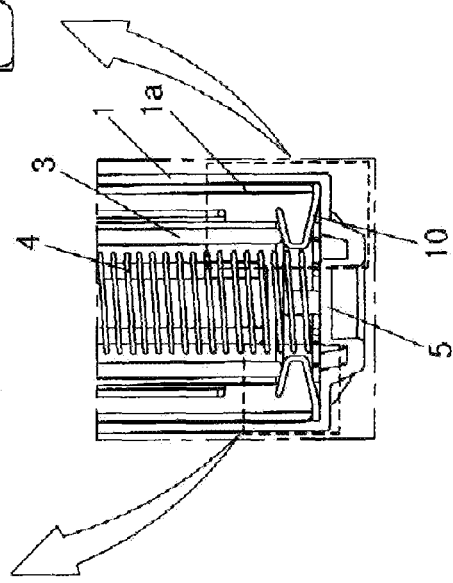

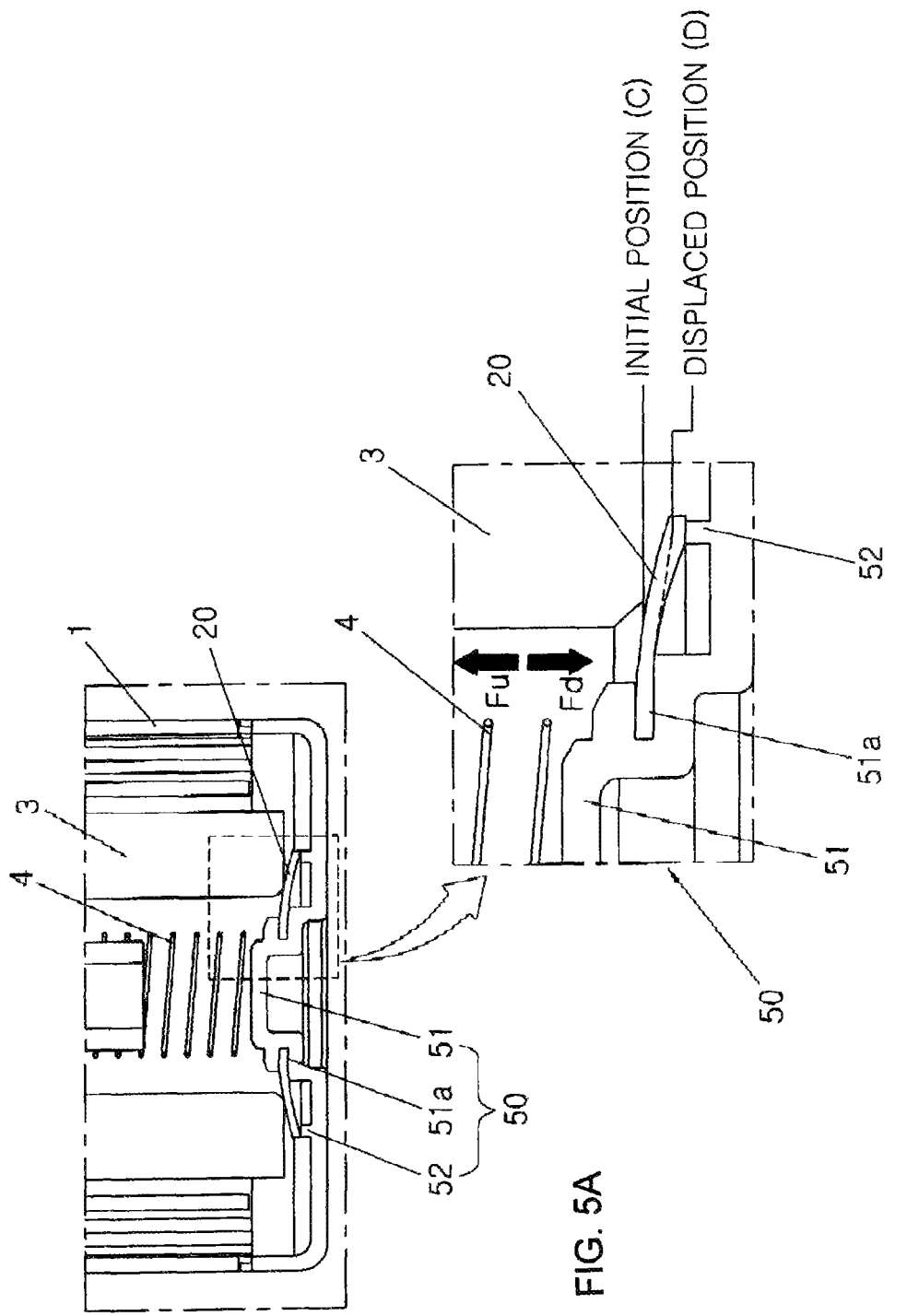

NOISEPROOF VENT VALVE FOR FUEL TANK

CROSS-REFERENCE(S) TO RELATED APPLICATIONS

This application claims priority to Korean Patent Application No. 10-2011-0124761, filed on Nov. 28, 2011, which is incorporated herein by reference in its entirety.

BACKGROUND OF THE INVENTION

1. Field of the Invention

Exemplary embodiments of the present invention relate to a vent valve for a fuel tank and, particularly, to a noiseproof vent valve for a fuel tank, capable of radically blocking occurrence of contact noise by preventing a float moving up and down in the fuel tank due to the fluctuation of fuel from coming into contact with the bottom of a valve body.

2. Description of Related Art

In general, vent valves for fuel tanks are be closed when an amount of fuel injected into a fuel tank reaches a fixed value, thereby functioning to prevent the fuel from being further injected into the fuel tank.

To this end, the vent valve is equipped with a float that is raised by a buoyant force of the fuel when a filled level of the fuel injected into the fuel tank reaches a preset range. Thus, the float is operated to block an upper side of a valve body, thereby preventing the fuel from being further injected from a fuel injection pipe.

FIG. 6A shows an internal configuration of a typical vent valve.

As shown, the vent valve is made up of a ball seat 2 that is installed along with a ball on an upper side of a valve body 1 to which a fuel injection pipe is coupled, a float 3 that occupies a space of the valve body 1 and is raised by a buoyant force of fuel in an exceeded state of injected fuel, and a spring 4 that elastically supports the float 3 using a lower end 5 of the valve body 1.

The spring 4 is subjected to compressive deformation by the float 3 moving down.

The lower end 5 is integrally formed with the valve body 1. However, the lower end 5 may be separately manufactured as needed, and then be coupled to the valve body 1.

The valve body 1 and the float 3 are typically formed of a plastic material.

When the fuel is injected and in a state in which an amount of fuel is not in a full state, the ball seat 2 installed on the upper side of the valve body 1 pushes down the float 3 while compressing the spring 4 under a gravitational force, thereby opening a vent passage. In contrast, the float 3 is raised to push up the ball along with the ball seat 2 by a buoyant force of the fuel, thereby closing the vent passage to block inflow of the fuel.

However, as described above, the float 3 is elastically supported by the spring 4 placed on the lower end 5 constituting the bottom of the valve body 1, and no support structure is applied between the lower end of the float 3 and the lower end 5 of the valve body 1. As such, there is no alternative but to have structural limitation in that noise occurs.

FIG. 6B shows another example of the aforementioned noise occurring at the vent valve. As shown, the float 3 moves between an initial position A and a displaced position B due to an intermittent buoyant force caused by the fluctuation of the fuel in the fuel tank during the traveling of a vehicle. The float 3 comes into contact with the lower end 5 at the displaced position B to which it moves down (denoted by "Ka"). Thereby, "clicking" contact noise continues to occur.

This contact noise gives very unpleasant sensation to a driver. Especially, in the case of hybrid vehicles, even low noise that is caused by a valve when an engine is turned off or when a motor is turned on and is introduced into an interior of the vehicle is an offensive sound. In this state, the introduction of the "clicking" contact noise of the vent valve into the interior of the vehicle may lead to the dissatisfaction of consumers.

Although such noise is irrelevant to operation and performance, it amplifies the dissatisfaction of consumers. Consequently, this noise has no alternative but to exert a great influence on the merchantability of the vehicle.

SUMMARY OF THE INVENTION

An embodiment of the present invention is directed to a noiseproof vent valve for a fuel tank, capable of radically blocking occurrence of contact noise by preventing a float moving up and down in the fuel tank due to the fluctuation of fuel from coming into contact with the bottom of a valve body.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a noiseproof vent valve for a fuel tank includes: a valve body having an inner body that protrudes from an inner wall thereof and forms a gap with a lower end forming a bottom of the valve body; a float that is elastically supported by a spring and moves up toward a vent passage formed in an upper portion of the valve body due to a buoyant force of fuel filled in the fuel tank; and a damping member that is fitted into and fixed to the gap of the inner body and prevents a lower surface of the float from coming into contact with the lower end even when undergoing compressive deformation by the float moving down toward the lower end.

Here, the damping member may include: a ring that is fitted into and fixed to the gap of the inner body formed on the inner wall of the valve body and is placed on the lower end forming the bottom of the valve body; and at least one elastic pieces that are integrally formed with an edge of the ring, are disposed around the center of the ring at regular intervals, and have a "C" shaped opening directed outwards with respect to the center of the ring.

Further, the elastic pieces may be formed so that four elastic pieces are disposed at regular intervals.

In accordance with another embodiment of the present invention, a noiseproof vent valve for a fuel tank includes: a valve body having an internal space; a float that is elastically supported by a spring and moves up toward a vent passage formed in an upper portion of the valve body due to a buoyant force of fuel filled in the fuel tank; a lower cover that is coupled to a lower portion of the valve body and has a coupling boss protruding from the center thereof in a stepped structure, and a circular seat having a greater diameter than the coupling boss and forming a concentric circle around the coupling boss; and a damping member that is fitted into and fixed to a groove cut in the coupling boss of the lower cover, is supported on the circular seat of the lower cover, and prevents a lower surface of the float from coming into contact with the lower cover even when undergoing compressive deformation by the float moving down toward the lower cover.

Here, the damping member may be formed in a shape of an elastically deformed disc ring.

Further, the groove cut in the coupling boss may have a difference in height relative to a bottom surface of the lower cover, and the height difference may be fitted to a deformed curvature of the disc ring acting as the damping member.

BRIEF DESCRIPTION OF THE DRAWINGS

FIGS. 2A to 2C show an internal configuration of the vent valve of FIG. 1.

FIGS. 5A and 5B show a noiseproof operation of the vent valve of FIG. 4.

DESCRIPTION OF SPECIFIC EMBODIMENTS

Figure 1A:
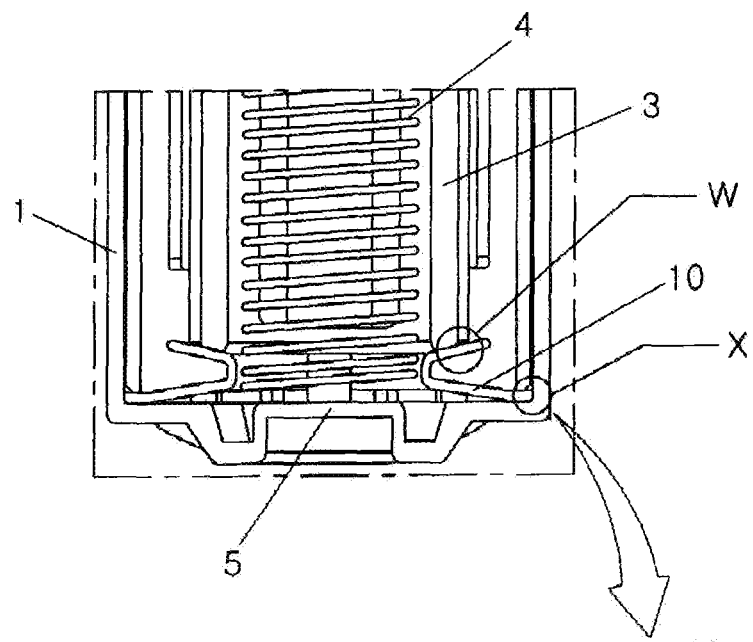
FIGS. 1A and 1B show a configuration of a noiseproof vent valve for a fuel tank in accordance with a first embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 1B:
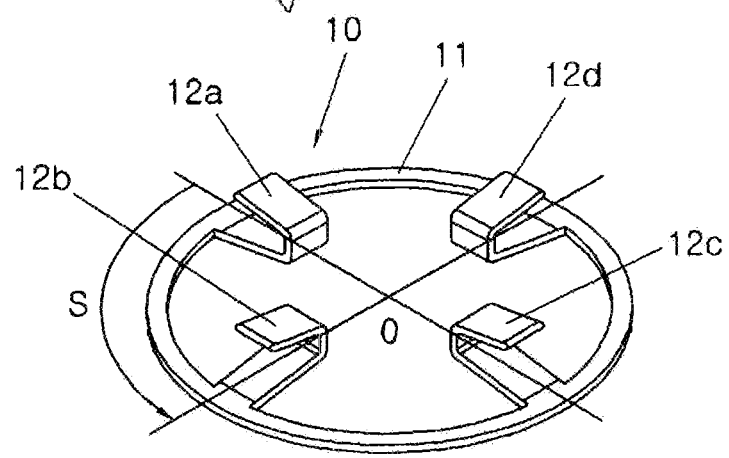

FIGS. 1A and 1B show a configuration of a noiseproof vent valve for a fuel tank according to a first embodiment of the present invention.

As shown, the vent valve includes a ball seat 2 that is installed along with a ball on an upper side of a valve body 1 to which a fuel injection pipe is coupled, a float 3 that occupies a space of the valve body 1 and is raised by a buoyant force of fuel in an exceeded state of injected fuel, a spring 4 that elastically supports the float 3 using a lower end 5 of the valve body 1 and is subjected to compressive deformation by the float 3 moving down, and a damping member 10 that is subjected to compressive deformation by a pressing force caused by the float 3 moving down and completely blocks contact of the lower end 5 and the float 3.

The lower end 5 is integrally formed with the valve body 1. However, if necessary, the lower end 5 may be manufactured as a separate member, and be coupled to the valve body 1.

Typically, the valve body 1 and the float 3 are formed of a plastic material.

The damping member 10 includes a ring 11 that is fitted using an inner wall of the valve body 1 (denoted by "X") and is placed on the lower end 5 forming the bottom, and at least two elastic pieces that are located in a space inside an edge of the ring 11 and are put in contact with a lower surface of the float 3 (denoted by "W").

The elastic pieces are integrally formed with the edge of the ring 11, and are formed as first, second, third, and fourth elastic pieces 12a, 12b, 12c, and 12d that are disposed around the ring 11 at intervals S of about 90 degrees with four pieces adopted as one set.

Alternatively, the elastic pieces may be configured to be disposed around the ring 11 at intervals S of about 120 degrees with three pieces adopted as one set.

In the first embodiment of the present invention, the first to fourth elastic pieces 12a to 12d are each formed in a "C" shape in which one side thereof is open, and the open side is directed outwards with respect to the center O of the ring 11.

FIGS. 2A to 2C show a cross section of the assembled noiseproof vent valve for a fuel tank according to the first embodiment of the present invention.

When the vent valve is assembled, the ball seat 2 opening or closing the vent passage is located on an upper side of the valve body 11. The float 3, which moves down due to the ball seat 2 and moves up due to the buoyant force of fuel, is elastically supported by a spring 4, and occupies the internal space of the valve body 1. The damping member 10 is coupled to the lower end 5 forming the bottom of the valve body 1 so as to be in contact with the lower surface of the float 3 spaced apart from the lower end 5.

In the state in which the damping member 10 is assembled, the ring 11 is kept placed on the lower end 5 forming the bottom of the valve body 1, and the elastic pieces 12a, 12b, 12c, and 12d, which are formed on the ring 11 with four pieces adopted as one set, are in contact with the lower surface of the float 3 elastically supported by the spring 4 (denoted by "W"), thereby occupying a space between the float 3 and the lower end 5.

Moreover, the edge of the ring 11 is fitted into a gap of an inner body 1a formed on the inner wall of the valve body 1 (denoted by "X"), thereby producing a fixing force.

This fixing structure using the edge of the ring 11 and the gap of the valve body 1 can provide an advantage in that the damping member 10 is applied without changing a design of the valve body 1. This means that the damping member 10 can be easily installed on an existing vent valve without a particular trouble.

Figure 3:
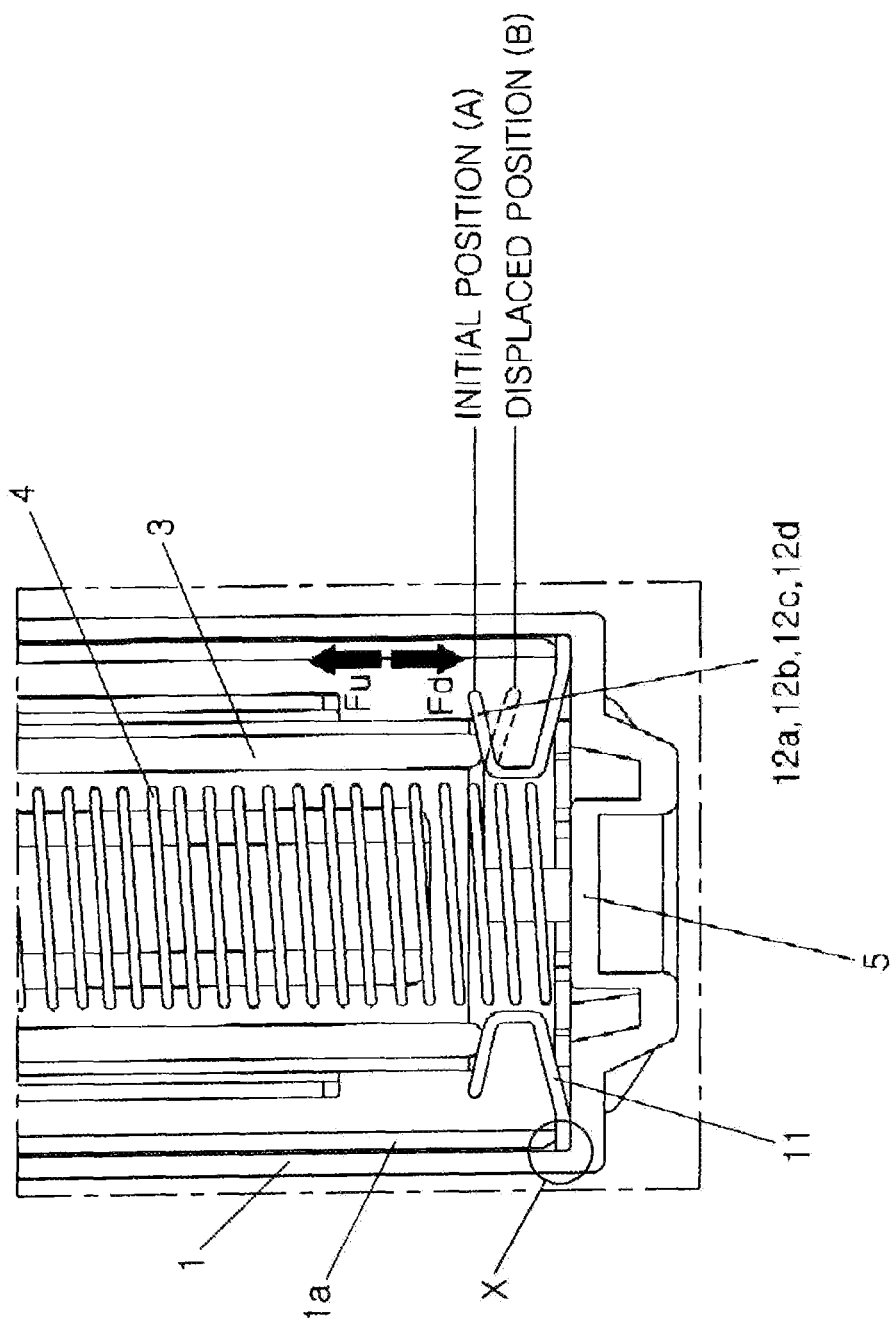
FIG. 3 shows a noiseproof operation of the vent valve of FIG. 1.

FIG. 3 shows a noiseproof operation of the vent valve using the damping member 10 in accordance with the first embodiment of the present invention.

As shown, the float 3 moves up when a buoyant force is applied (denoted by an arrow Fu), and moves down when the buoyant force is not applied (denoted by an arrow Fd). Thus, the float 3 moves up and down due to an intermittent buoyant force caused by the fluctuation of the fuel in the fuel tank during the traveling of a vehicle.

However, the damping member 10, which is fixed to the valve body 1 (denoted by "X") and is installed between the float 3 and the lower end 5, hinders the downward movement of the float 3 using the four elastic pieces 12a, 12b, 12c, and 12d (denoted by the arrow Fd). Thereby, the float 3 is prevented from coming into contact with the lower end 5 forming the bottom of the valve body 1.

For this reason, although the float 3 moves up and down, no "clicking" contact noise occurs at the vent valve. Even when the float 3 excessively moves up and down, the prevention of noise of the vent valve can be maintained by the damping member 10 working in line with the excessive movement.

As an example, when a pressing force of the float 3 moving down (denoted by the arrow Fd) is stronger than an elastic force of the elastic pieces 12a, 12b, 12c, and 12d of the damping member 10 supporting the float 3, the elastic pieces 12a, 12b, 12c, and 12d are elastically deformed from an initial position A to a displaced position B. This elastic deformation of the elastic pieces 12a, 12b, 12c, and 12d absorbs the downward displacement of the float 3.

The absorption of the downward displacement of the float 3 using the elastic pieces 12a, 12b, 12c, and 12d prevents the float 3 from coming into contact with the lower end 5 forming the bottom of the valve body 1. As such, although the float 3 fluctuates excessively, no "clicking" contact noise occurs at the vent valve.

As described above, the damping member 10 according to the first embodiment of the present invention has at least two elastic pieces, preferably the four elastic pieces 12a, 12b, 12c, and 12d. The upward and downward movement of the float 3 is absorbed by the elastic deformation of the elastic pieces 12a, 12b, 12c, and 12d, and thus the float 3 is prevented from coming into contact with the lower end 5 forming the bottom of the valve body 1. However excessively the float 3 fluctuates, no "clicking" contact noise occurs at the vent valve. As a result, the merchantability of a hybrid vehicle sensitive to low noise can be greatly increased.

Figure 4A:
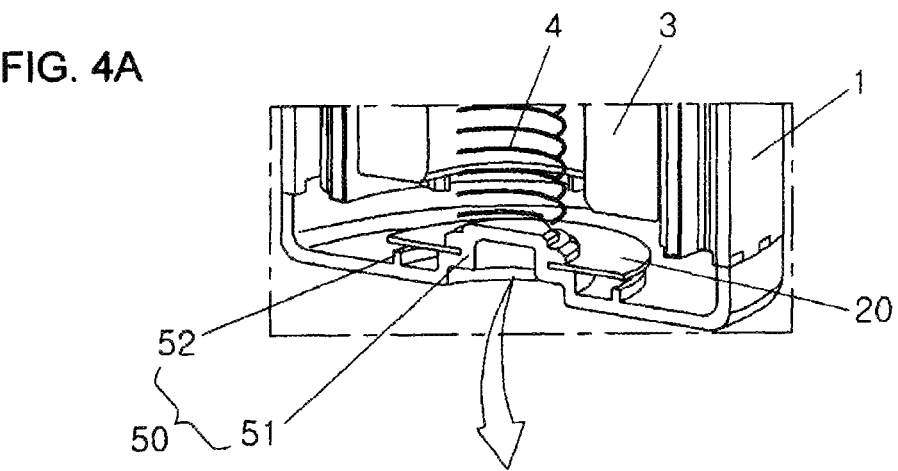
FIGS. 4A and 4B show a configuration of a noiseproof vent valve for a fuel tank in accordance with a second embodiment of the present invention.
Figure 4B:
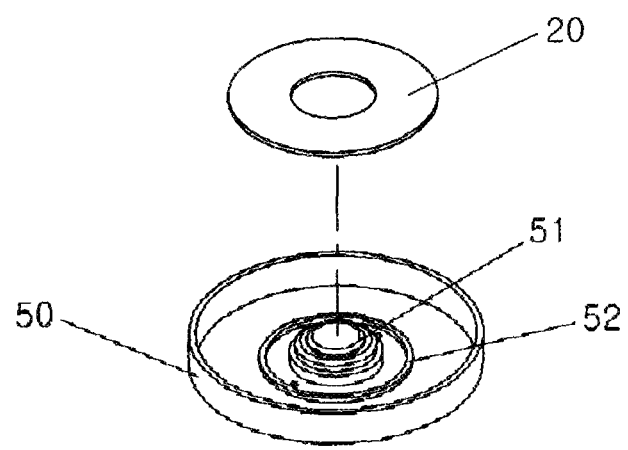
Figure 6A:
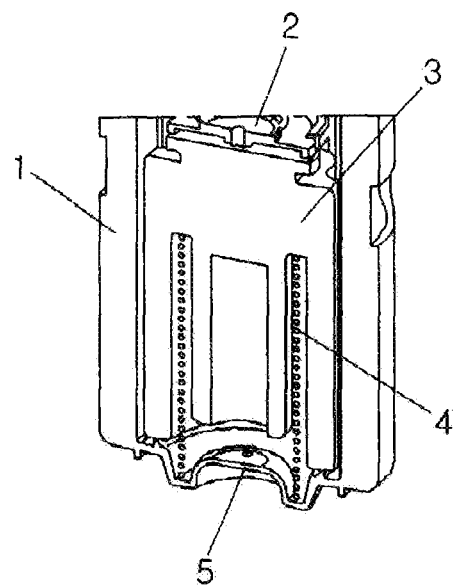
FIGS. 6A and 6B show a configuration and a noise occurring operation of a conventional vent valve for a fuel tank.
Figure 6B:
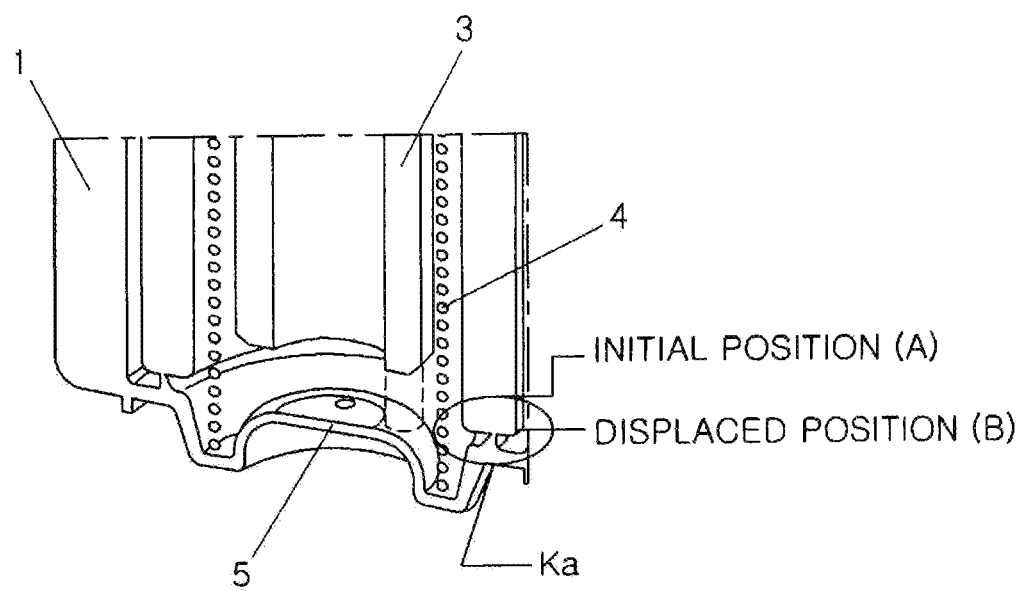

Meanwhile, FIGS. 4A and 4B show a configuration of a noiseproof vent valve for a fuel tank according to a second embodiment of the present invention.

As shown, it can be seen that the vent valve according to the second embodiment is made up of a ball seat 2 and a float 3, both of which have the same function as those of the vent valve according to the first embodiment, and a spring 4. Further, the vent valve according to the second embodiment includes a damping member 20, which is equal in function and is different in shape, compared to the damping member 10 according to the first embodiment.

In detail, the damping member 20 of the second embodiment is formed in a shape of an elastically deformed disc ring, and thus has a very simple shape, compared to the damping member 10 of the first embodiment. Due to the very simple shape of the damping member 20, the cost competitive power can be greatly increased, compared to the damping member 10 of the first embodiment.

However, the damping member 20 of the second embodiment requires a vent valve having an assembly structure suitable for its shape. For this reason, a valve body 1 of the second embodiment requires a lower cover 50 separately manufactured so as to be coupled using a lower portion thereof. In this respect, the valve body 1 of the second embodiment is different from the valve body 1 of the first embodiment which is integrally formed with the lower end 5 forming the bottom thereof.

The lower cover 50 includes a coupling boss 51 protruding from the center thereof in a stepped structure, and a circular seat 52 that has a greater diameter than the coupling boss 51, forms a concentric circle around the coupling boss 51, and protrudes to a lower height than the coupling boss 51.

The coupling boss 51 further includes a groove 51a cut along an outer circumference thereof. The groove 51a is formed at a higher height than the height of the circular seat 52 protruding from a bottom surface of the lower cover 50. A height difference between the groove 51a and the circular seat 52 is fitted to a deformed curvature of the disc ring acting as the damping member 20.

As described above, since the height difference between the groove 51a and the circular seat 52 is fitted to a deformed curvature of the disc ring acting as the damping member 20, the damping member 20 is not deformed when it is fitted into the groove 51a and is in close contact with the circular seat 52.

In the second embodiment of the present invention, the lower cover 50 and the valve body 1 are detachably coupled by applying a typical fastening structure such as a groove and protrusion structure or a hook structure.

FIGS. 5A and 5B show a noiseproof operation of the vent valve using the damping member 20 in accordance with the second embodiment of the present invention.

As shown, the float 3 moves up when a buoyant force is applied (denoted by an arrow Fu), and moves down when the buoyant force is not applied (denoted by an arrow Fd). Thus, the float 3 moves up and down due to an intermittent buoyant force caused by the fluctuation of the fuel in the fuel tank during the traveling of a vehicle.

However, the damping member 20, which is fitted into and fixed to the groove 51a of the coupling boss 51 of the lower cover 50 coupled to the valve body 1 and is supported on the circular seat 52, hinders the downward movement of the float 3 (denoted by the arrow Fd). Thereby, the float 3 is prevented from coming into contact with the lower cover 50 forming the bottom of the valve body 1.

For this reason, although the float 3 moves up and down, no "clicking" contact noise occurs at the vent valve. Even when the float 3 excessively moves up and down, the prevention of noise of the vent valve can be maintained by the damping member 20 working in line with the excessive movement.

As an example, when a pressing force of the float 3 moving down (denoted by the arrow Fd) is stronger than an elastic force of the damping member 20 supporting the float 3, the damping member 20 is elastically deformed from an initial position C to a displaced position D. This elastic deformation of the damping member 20 absorbs the downward displacement of the float 3, thereby preventing the occurrence of the "clicking" contact noise.

As described above, like the damping member 10 of the first embodiment, the damping member 20 of the second embodiment prevents the occurrence of the "clicking" contact noise even when the float 3 fluctuates excessively, and thus can considerably increase the merchantability of a hybrid vehicle. In addition to this, in comparison with the damping member 10 of the first embodiment, the damping member 20 of the second embodiment is formed in the disc ring of a very simple shape, and thus can greatly increase the cost competitive power.

In accordance with the exemplary embodiments of the present invention, the float moving up and down due to an intermittent buoyant force caused by the fluctuation of fuel is prevented from coming into contact with the bottom of a valve body, so that contact noise itself does not occur radically. Particularly, the vent valve is applied to a hybrid vehicle that is sensitive to low noise introduced into the interior thereof, the merchantability of the hybrid vehicle can be greatly increased.

While the present invention has been described with respect to the specific embodiments, it will be apparent to those skilled in the art that various changes and modifications may be made without departing from the spirit and scope of the invention as defined in the following claims.

What is claimed is:

1. A noiseproof vent valve for a fuel tank, comprising:
a valve body having an inner body that protrudes from an inner wall thereof and forms a gap with a lower end forming a bottom of the valve body;
a float that elastically supported by a spring and configured to move up toward a vent passage formed in an upper portion of the valve body due to a buoyant force of fuel filled in the fuel tank; and
a damping member fitted into and fixed to the gap of the inner body and configured to prevent a lower surface of the float from coming into contact with the lower end even when undergoing compressive deformation by the float moving down toward the lower end.

2. The noiseproof vent valve of claim 1, wherein the damping member comprises:
- a ring fitted into and fixed to the gap of the inner body formed on the inner wall of the valve body, and placed on the lower end forming the bottom of the valve body; and
- at least one elastic pieces integrally formed with an edge of the ring, disposed around the center of the ring at regular intervals, and having a "C" shaped opening directed outwards with respect to the center of the ring.

3. The noiseproof vent valve of claim 2, wherein the elastic pieces are formed so that four elastic pieces are disposed at regular intervals.

4. A noiseproof vent valve for a fuel tank, comprising:
- a valve body having an internal space;
- a float elastically supported by a spring and configured to move up toward a vent passage formed in an upper portion of the valve body due to a buoyant force of fuel filled in the fuel tank;
- a lower cover coupled to a lower portion of the valve body and having a coupling boss protruding from the center thereof in a stepped structure, and a circular seat having a greater diameter than the coupling boss and forming a concentric circle around the coupling boss; and
- a damping member fitted into and fixed to a groove cut in the coupling boss of the lower cover, supported on the circular seat of the lower cover, and configured to prevent a lower surface of the float from coming into contact with the lower cover even when undergoing compressive deformation by the float moving down toward the lower cover.

5. The noiseproof vent valve of claim 4, wherein the damping member is formed in a shape of an elastically deformed disc ring.

6. The noiseproof vent valve of claim 4, wherein the groove cut in the coupling boss has a difference in height relative to a bottom surface of the lower cover, and the height difference is fitted to a deformed curvature of the disc ring acting as the damping member.

* * * * *